United States Patent
Honda

(10) Patent No.: US 8,375,238 B2
(45) Date of Patent: Feb. 12, 2013

(54) MEMORY SYSTEM

(75) Inventor: Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 440 days.

(21) Appl. No.: 12/788,740

(22) Filed: May 27, 2010

(65) Prior Publication Data

US 2010/0313055 A1    Dec. 9, 2010

(30) Foreign Application Priority Data

May 28, 2009    (JP) ................................. 2009-128461

(51) Int. Cl.
*G06F 1/12* (2006.01)

(52) U.S. Cl. ........ 713/400; 713/600; 711/157; 711/167; 365/191; 365/233.1

(58) Field of Classification Search .................. 713/400, 713/600; 711/157, 167; 365/191, 233.1
See application file for complete search history.

(56) References Cited

U.S. PATENT DOCUMENTS

| | | | |
|---|---|---|---|
| 5,319,755 A | 6/1994 | Farmwald et al. | |
| 5,499,385 A | 3/1996 | Farmwald et al. | |
| 5,606,717 A | 2/1997 | Farmwald et al. | |
| 5,714,878 A * | 2/1998 | Saito et al. | 324/121 R |
| 6,643,217 B2 * | 11/2003 | Ikeda | 365/233.17 |
| 8,015,382 B1 * | 9/2011 | Fung | 711/167 |
| 2003/0084365 A1 * | 5/2003 | Kubo | 713/500 |
| 2006/0023499 A1 | 2/2006 | Ryu | |

FOREIGN PATENT DOCUMENTS

| | | |
|---|---|---|
| JP | 2001-273765 | 10/2001 |
| JP | 2006-40518 | 2/2006 |
| JP | 2006-277892 | 10/2006 |
| WO | 91/16680 | 10/1991 |

* cited by examiner

*Primary Examiner* — Thuan Du

(74) *Attorney, Agent, or Firm* — Wenderoth, Lind & Ponack, L.L.P.

(57) ABSTRACT

A memory controller takes in the first to (N−1)th pieces of data respectively in synchronization with the second to Nth return read clocks. The memory controller takes in the Nth piece of data from stop of output of the Nth read clock and before a first predetermined time. The memory controller sets an output period of the Nth read clock to be longer than an output period of each of the first to (N−1)th read clocks.

12 Claims, 8 Drawing Sheets

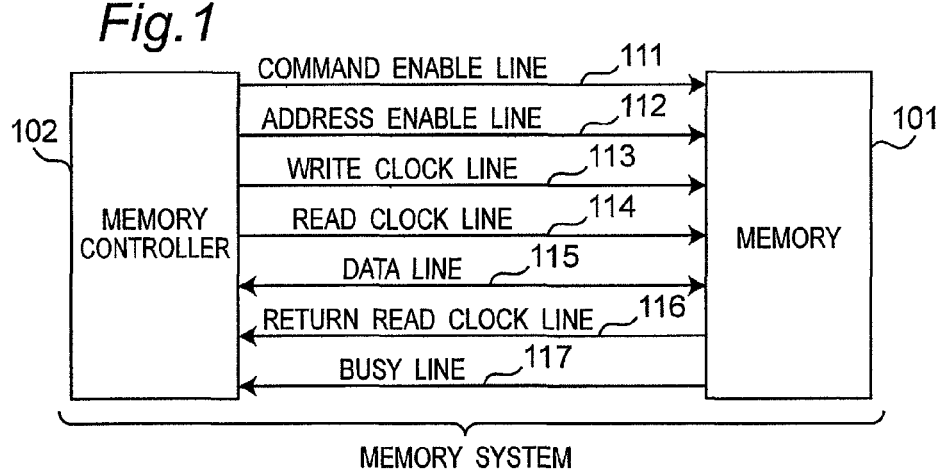
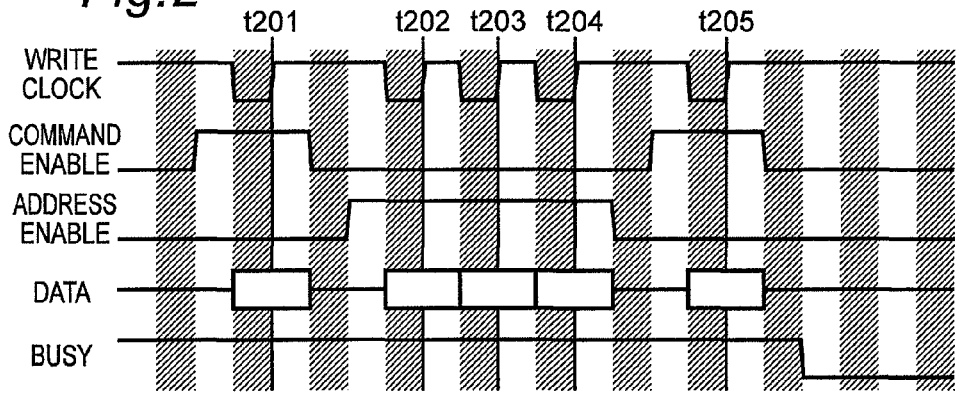
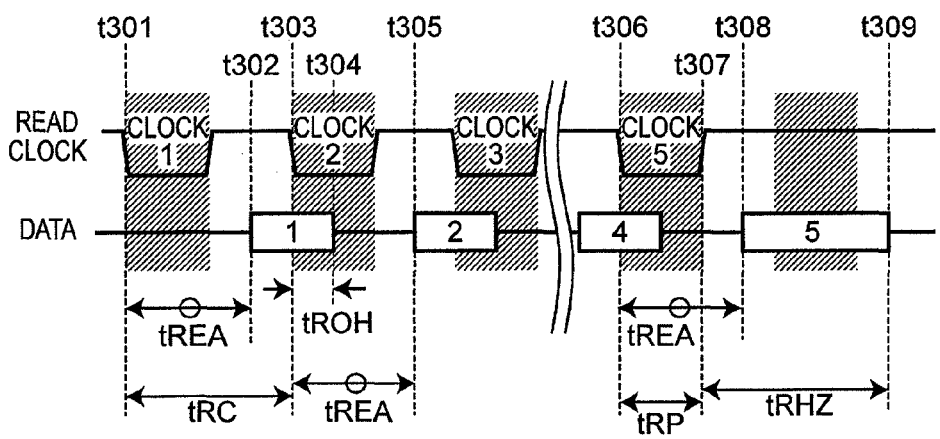

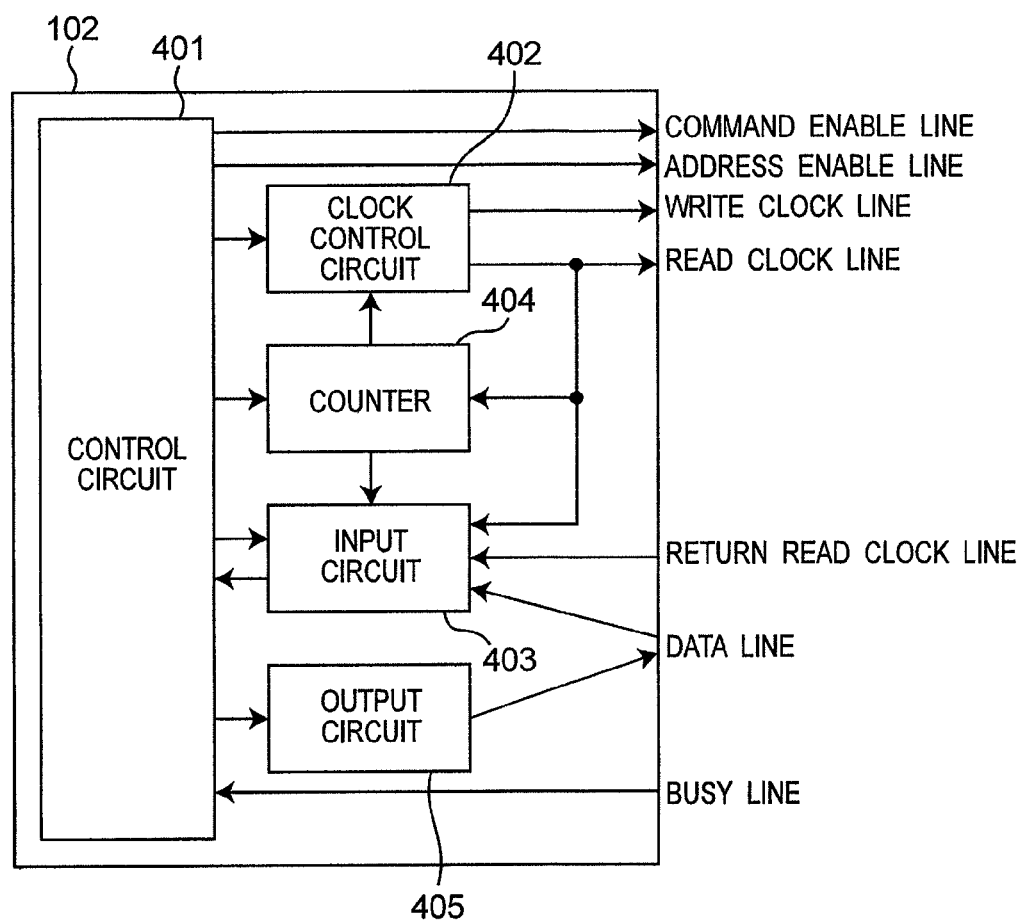

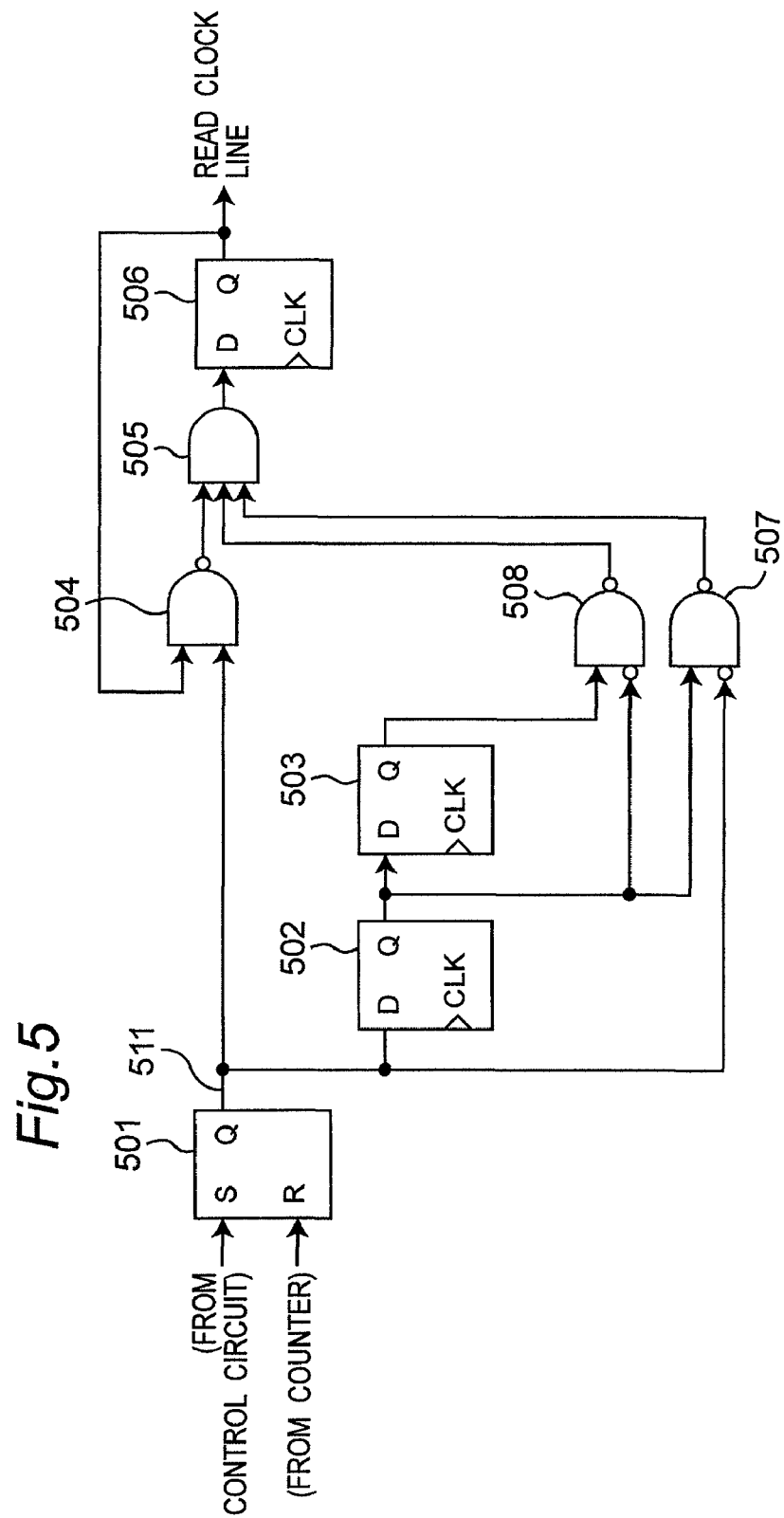

MEMORY SYSTEM

BACKGROUND

1. Technical Field

The present invention relates to a memory system in which a clock is provided from a memory controller to a memory, and data is output from the memory to the memory controller in synchronization with the clock.

2. Related Art

In connection with a memory system including a memory and a memory controller, acceleration of data transfer between the memory and the memory controller is required. JP-A-2006-40518, JP-A-2001-273765, and JP-A-2006-277892 disclose, as the memory system capable of achieving acceleration of data transfer, a memory that is which are capable of outputting consecutive data in synchronization with a clock externally provided to a semiconductor memory such as, for example, EDO (Extended Data Out) type DRAM, SDRAM (Syncronous DRAM) and the like. In such a memory system data whose address is incremented in synchronization with the clock is output.

Referring to the timing chart of FIG. 9, a description will be given of an exemplary case in which data is output having its address incremented in synchronization with a clock. The clock is a control signal applied from the memory controller to the memory. The data is output from the memory to the memory controller in synchronization with the clock. Prior to data reading, a command that instructs data reading with specifying an address is issued from the memory controller to the memory.

When the clock is output from the memory controller at time t901, the memory starts outputting data (data 1) to a data line by time t903, which is a time point after a certain period with reference to fall of the clock. This period is referred to as the Read Access Time (tREA).

When the clock is output from the memory controller at time t904, the memory stops outputting the previous data at time t905 or later, which is a time point after a certain period with reference to fall of the clock, and the memory starts outputting next data (data 2) whose address is obtained by incrementing the current address, by time t906. The time from t904 to t905 is referred to as the RE Low Output Hold Time (tRLOH). As can be seen from the timing chart, the relationship represented by the following formula is established between the tREA and tRLOH:

$$tREA > tRLOH$$

The memory controller can take in the data from the memory at a timing of fall of the clock (for example, t904). While the data take-in can be carried out in a period from t903 to t905, it is assumed herein that the data take-in is carried out in synchronization with the clock of the memory controller.

In this manner, by incrementing the address of data on the memory side in synchronization with fall of the clock, it becomes possible for the memory controller to read data from the memory, without the necessity of outputting the address of read target data to the memory every time.

tREA is a value that is uniquely determined depending on the device capacity of the memory. In order for the memory controller to read data from the memory at the fastest possible speed, the cycle time tRC of the clock must be shortened. However, the memory controller cannot take in the data from the data line when the relationship represented by the following formula is established:

$$tREA > tRC$$

Here, when the data output from the memory is taken into the memory controller, the following must be considered. That is, a delay in arrival of the clock from the memory controller to the memory and/or a delay in arrival of the data output from the memory to the memory controller may occur, attributed to capacitive components of the data line between the memory controller and the memory, and the like.

In order to solve the delay problem, there are methods of taking data into the memory controller using a delayed clock, or a clock returned from the memory to the memory controller.

FIG. 10 is a timing chart of a case where clocks are output, e.g., on a five-by-five basis, when the memory controller reads data from the memory. This memory system is provided with, in addition to the clock and the data shown in FIG. 9, a return clock line, through which the clock having been transferred from the memory controller to the memory through the clock line, is returned from the memory to the memory controller.

In this exemplary case, by using the return clock (i.e., the clock having been transferred from the memory controller to the memory through the clock line, and thereafter returned to the memory controller through the return clock line) as the reference, the data output from the memory can be taken in.

However, the memory systems configured as described above still suffer a problem that the piece of data set last cannot be taken in by a single-time command issue. Specifically, while the number of clocks output by a single-time command issue is determined to be a predetermined number, as shown in FIG. 10, because there is no return clock that temporally overlap the fifth piece of data that is output from the memory by the fifth (last) clock, the data take-in with reference to the return clock cannot be carried out. Further, in connection with the sixth to tenth pieces of data, because there is no return clock that temporally overlaps the tenth piece of data that is output by the tenth (last) clock, the data take-in with reference to the return clock cannot be carried out. The same holds true for the pieces of data that follow.

An exemplary solution for this problem is the following method. In order to take in the data of, e.g., fifth piece, take in first to fourth pieces of data, and thereafter issue a command indicative of the address that specifies that the read-start data is the fifth piece of data from the memory controller to the memory, so as to cause the memory to output data again from the fifth piece of data. The same holds true for the tenth piece of data.

However, according to such a method, when commands are consecutively issued for reading data from consecutive addresses, the address of the last piece of data output by the previous command must be specified for each command. Therefore, the associated overhead increases and the data transfer performance of memory system reduces.

SUMMARY

In order to solve the problems described above, a memory system of the first aspect includes a memory, a memory controller, and a memory interface electrically connecting the memory and the memory controller to each other, wherein the memory interface includes a data line driven by the memory for transferring data, and a clock line which is driven by the memory controller and transfers read clocks for controlling a timing of outputting the data from the memory to the data line, when the memory outputs N pieces of data, the memory starts outputting N pieces of data in synchronization with first to Nth read clocks consecutively output from the memory controller, stops the outputting of first to (N−1)th pieces of data respectively in synchronization with second to Nth read clocks, and stops the outputting of Nth piece of data after a first predetermined time from stop of output of the Nth read clock, and the memory controller takes in the first to (N−1)th pieces of data respectively in synchronization with the second to Nth read clocks, and takes in the Nth piece of data in a period from start of output of the Nth piece of data based on the Nth read clock to stop of the output of the Nth piece of data, and the memory controller sets an output period of the Nth read clock to be longer than an output period of each of the first to (N−1)th read clocks.

A memory system of the second aspect includes a memory, a memory controller; and a memory interface electrically connecting the memory and the memory controller to each other, wherein the memory interface includes a data line driven by the memory for transferring data, a clock line which is driven by the memory controller and transfers read clocks for controlling a timing of outputting the data from the memory to the data line, and a return read clock line for returning the read clock arrived at the memory via the clock line back to the memory controller as return read clock, when the memory outputs N pieces of data, the memory starts outputting N pieces of data in synchronization with first to Nth read clocks consecutively output from the memory controller, stops the outputting of first to (N−1)th pieces of data respectively in synchronization with second to Nth read clocks, and stops the outputting of Nth piece of data after a first predetermined time from stop of output of the Nth read clock, and the memory controller takes in the first to (N−1)th pieces of data respectively in synchronization with second to Nth return read clocks, and takes in the Nth piece of data in a period from start of output of the Nth piece of data based on the Nth read clock to stop of the output of the Nth piece of data, and the memory controller sets an output period of the Nth read clock to be longer than an output period of each of the first to (N−1)th read clocks.

With the memory system of the first aspect, when the memory controller is to consecutively read N pieces of data from the memory, the memory controller takes in the Nth piece of data in a period from start of output of the Nth piece of data based on the Nth read clock to stop of the output of the Nth piece of data, and the memory controller sets an output period of the Nth read clock to be longer than an output period of each of the first to (N−1)th read clocks. Thus, as compared to a case in which the output period is not set to be longer, the Nth piece of data can be held on the data line for a longer period. That is, this increases the period during which the memory controller can take in data from the memory. For example, by setting the timing of the output completion of the Nth read clock to overlap the output period of the Nth piece of data to the data line, it becomes possible to take in the Nth piece of data using the edge at the output completion of the Nth read clock. It is noted that, it is also possible to take in the Nth piece of data using a signal other than the Nth read clock within a period during which the Nth piece of data can be held on the data line.

In this manner, with the present memory system, by outputting N read clocks, the memory controller can read and take in the pieces of data as many as the output read clocks from the memory. Accordingly, by outputting the (N+1)th and following read clocks, it becomes possible to cause the (N+1)th and following pieces of data to be output from the memory, and the output data can be taken in by the memory controller. That is, after the memory controller reads and takes in the N pieces of data, a command specifying the address needs not to be issued once again when the memory controller is to read the (N+1)th and following pieces of data. This makes it possible to improve the data transfer performance in the memory system.

Further, with the memory system of the second aspect, the first to (N−1)th pieces of data are taken in in synchronization with the return read clocks. The return read clocks are the clocks which are delayed relative to the read clocks. Accordingly, in addition to the effect obtained by the memory system of the first aspect, the following effect can be obtained: even when there is a delay in transferring any read clock or data between the memory and the memory controller, it becomes possible for the memory controller to take in the data output from the memory.

BRIEF DESCRIPTION OF DRAWINGS

FIG. 1 is a configuration diagram of a memory system according to an embodiment.

FIG. 2 is a timing chart showing the timing of a memory controller issuing a read command to the memory when the memory controller is to read data from the memory, and others.

FIG. 3 is a timing chart representing the data output timing of the memory.

FIG. 4 is a configuration diagram of the memory controller.

FIG. 5 is a circuit diagram of a clock control circuit of the memory controller.

DETAILED DESCRIPTION OF PREFERRED EMBODIMENT

Figure 6:
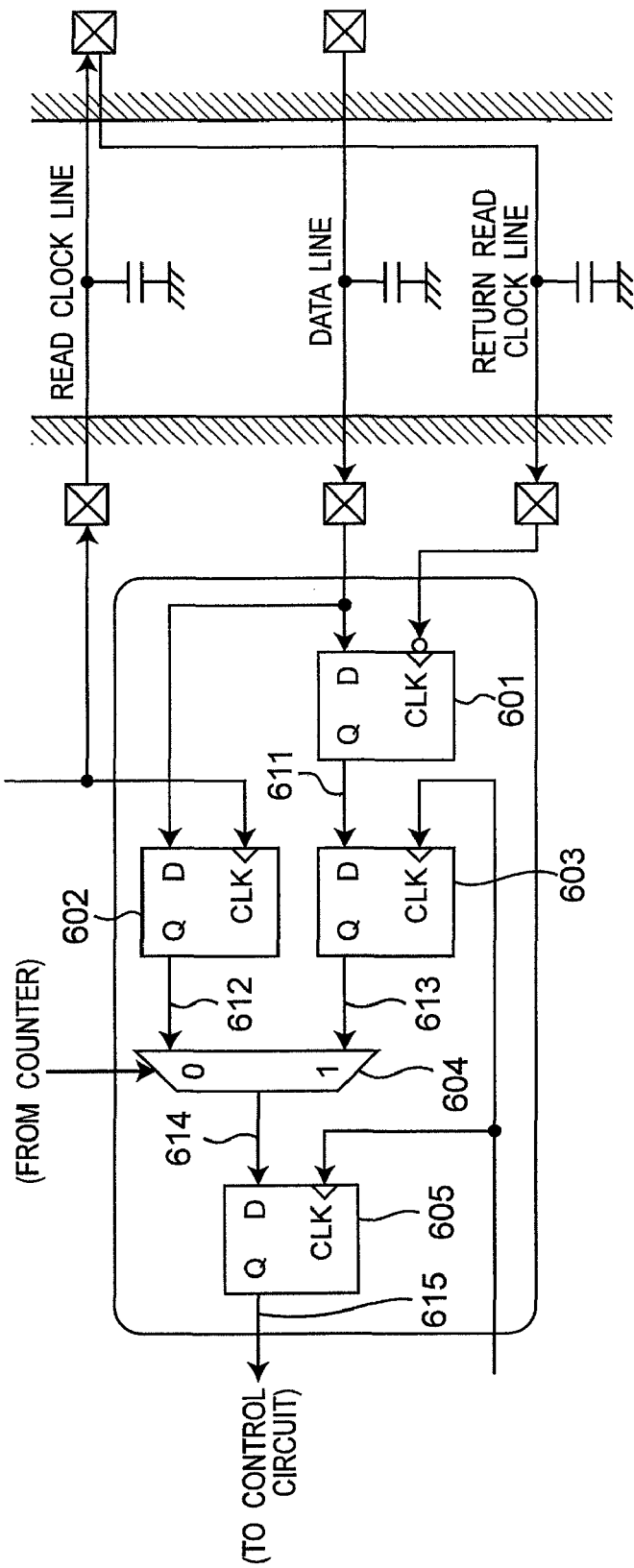
FIG. 6 is a circuit diagram of an input circuit of the memory controller.

Referring to the drawings, a description will be given of an embodiment.

FIG. 1 shows the configuration of a memory system of the present embodiment.

The memory system of the present embodiment includes a memory 101 and a memory controller 102. The memory 101 is a NAND type flash memory.

Between the memory 101 and the memory controller 102, a memory interface including a plurality of signal lines is provided. The memory interface includes a command enable line 111, an address enable line 112, a write clock line 113, a read clock line 114, a data line 115, a return read clock line 116, and a busy line 117.

The command enable line 111 transfers to the memory 101 a control signal which is output from the memory controller 102 and is indicative of a period during which a command is issued.

The address enable line 112 transfers to the memory 101 a control signal which is output from the memory controller 102 and is indicative of a period during which an address is specified.

The write clock line 113 transfers to the memory 101 a control signal (write clock) which is output from the memory controller 102 and is indicative of the transfer timing at which a command, an address and data are transferred to the memory 101.

The read clock line 114 transfers to the memory 101 a control signal (read clock) which is output from the memory controller 102 and is indicative of the timing at which data is to be transferred from the memory 101.

The data line 115 is a plurality of buses. The data line 115 transfers to the memory 101 signals which are output from the memory controller 102 and are indicative of a command, an address or the like. Further, the data line 115 transfers to the memory controller 102 a signal which is output from the memory 101 and is indicative of data.

The return read clock line 116 transfers a read clock having been transferred from the memory controller 102 to the memory 101 through the read clock line 114, from the memory 101 to the memory controller 102. The read clock returned from the memory 101 to the memory controller 102 through the return read clock line 114 (hereinafter referred to as the "return read clock") is a clock signal that is delayed relative to the timing at which it is output from the memory controller 102.

The busy line 117 transfers to the memory controller 102 a signal which is output from the memory 101 and is indicative of whether or not the memory 101 is capable of outputting data to the memory controller 102. This signal is transferred at a negative polarity level.

FIG. 2 is a timing chart showing an operation of the memory controller 102 issuing a read command to the memory 101 when the memory controller 102 is to read data from the memory 101 in the memory system of the present embodiment.

While the memory controller 102 outputs an "H" signal to the command enable line 111 and an "L" signal to the address enable line 112, the memory controller 102 outputs a write clock to the write clock line 113. Further, the memory controller 102 outputs to the data line 115 a command that specifies a read start address, at the timing of a rising edge of the write clock (t201).

Thereafter, while the memory controller 102 outputs an "L" signal to the command enable line 111 and an "H" signal to the address enable line 112, the memory controller 102 outputs three consecutive write clocks to the write clock line 113. Further, the memory controller 102 outputs to the data line 115 three pieces of data each indicative of a read target address, at the timing of rising edges of the write clocks (t202, t203 and t204).

Thereafter, while the memory controller 102 outputs an "H" signal to the command enable line 111 and an "L" signal to the address enable line 112, the memory controller 102 outputs a write clock to the write clock line 113. Further, the memory controller 102 outputs to the data line 115 a command that instructs to output the data for the read target addresses specified at the time t202, t203 and t204, at the timing of a rising edge of the write clock (t205).

When the memory 101 receives the commands and addresses output at t201 to t205, the memory 101 outputs to the busy line 117 an "L" signal indicative of a busy state, until the data for the read target addresses become ready to be output to the data line. When the read data are ready to be output, the memory 101 outputs an "H" signal to the busy line 117. Then, in synchronization with a read clock which is output from the memory controller 102 to the read clock line 114, the memory 101 outputs the data for the read target addresses to the data line 115 (not shown in FIG. 2). Next, referring to FIG. 3, a description will be given of a manner of outputting the data for the read target addresses.

FIG. 3 is a timing chart representing an exemplary state where the memory 101 outputs data in the memory system.

When the memory controller 102 is to read data from the memory 101, the memory controller 102 outputs a read clock to the read clock line 114.

In synchronization with the read clock of the read clock line 114, the memory 101 outputs data to the data line 115.

The memory 101 starts outputting data 1 to the data line 115 by time t302, which is a time point after tREA (Read Access time) with reference to the falling edge of a read clock 1 at time t301.

The memory 101 holds the data 1 whose output has been started with reference to the falling edge of the read clock 1 at time t301 on the data line 115 until time t304, which is a time point after tROH (Read Output Hold time) with reference to the falling edge of the read clock 2 at time t303 (i.e., the memory 101 stops outputting data to the data line 115 at time t304). The memory 101 starts outputting data 2 to the data line 115 by t305, which is a time point after tREA with reference to the falling edge of the read clock 2 at time t303. Accordingly, the relationship represented by the following formula is essentially established:

$$tROH < tREA$$

Here, in the memory system of the present embodiment, when the memory 101 detects the falling edge of a read clock, the memory 101 increments the address, and outputs data corresponding to the incremented address. In other words, so long as the data for consecutive addresses are read, the entry of a command that specify an address is not required. This makes it possible to carry out fast data reading.

The period from the falling edge of a read clock to the falling edge of the next read clock is referred to as tRC (Read Cycle (cycle time)). The memory controller 102 controls the timing of outputting the read clock to the read clock line 114 such that the relationship represented by the following formula is established at the very least:

$$tRC > tREA - tROH$$

However, if the relationship tRC<tREA is established, then, when a read clock that follows the read clock used by the memory 101 as the reference of outputting the data arrives at the memory 101, the memory 101 does not output data yet. That is, the memory controller 102 cannot take in the data from the data line 115. Additionally, for achieving ever faster data transfer, tRC should preferably be as short as possible. Accordingly, the memory controller 102 controls the timing of outputting read clock to the read clock line 114 so as to satisfy the relationship established by the following formula. Additionally, tRC is set to be a value slightly longer than tREA:

$$2 \times tREA > tRC > tREA$$

The memory 101 starts outputting data 5 by time t308, which is a time point after tREA with reference to the falling edge of the last read clock 5 at time t306. The memory 101 holds the data 5 on the data line 115 until t309, which is a time point after tRHZ (Read Output High Resistance time: the time at which output to the data line is stopped) with reference to the rising edge of the read clock 5 at time t307 (i.e., the memory 101 stops outputting the data to the data line 115 at t309).

FIG. 4 is a diagram showing the internal configuration of the memory controller 102.

The memory controller 102 includes a control circuit 401, a clock control circuit 402, an input circuit 403, a counter 404, and an output circuit 405.

The control circuit 401 controls the entire memory controller 102. The control circuit 401 outputs to the command enable line 111 a control signal indicative of a period during which a command is issued. The control circuit 401 outputs to the address enable line 112 a control signal indicative of a period during which an address is specified. The control circuit 401 receives a busy signal from the busy line 117.

The clock control circuit 402 outputs to the write clock line 113 a command, an address, and a control signal (write clock) indicative of the transfer timing at which data is to be transferred to the memory 101. The clock control circuit 402 outputs to the read clock line 114 a control signal (read clock) indicative of the timing at which the memory 101 is to transfer data.

When the control circuit 401 starts reading data from the memory 101, the control circuit 401 divides the entire data which is the target of reading into data groups including a predetermined number of pieces of data, and carries out reading on a data group-by-data group basis. The control circuit 401 sets the predetermined number in the counter 404.

In synchronization with a read clock which is output from the clock control circuit 402 to the read clock line 114, the counter 404 decrements the counter value. When the counter value reaches "1", the counter 404 reports to the clock control circuit 402 that the piece of data to be read is the last piece of data among the pieces of data constituting one data group. Further thereafter, when the counter value reaches "0", the counter 404 reports to the input circuit 403 that take-in of the last piece of data among the pieces of data constituting one data group is completed.

Until the input circuit 403 is reported by the counter 404 that the data is the final piece of data, the input circuit 403 takes in data from the data line 115 in synchronization with return read clocks of the return read clock line 116. When the input circuit 403 is reported by the counter 404 that the piece of data is the final piece of data, the input circuit 403 takes in the piece of data from the data line 115 in synchronization with a read clock of the read clock line 114.

The output circuit 405 outputs data such as commands, addresses and the like to the data line 115.

FIG. 5 is a circuit diagram of a portion of the clock control circuit 402, which relates to output control of the read clocks to the read clock line 114.

This portion related to the output control includes an RS flip-flop 501, D flip-flops 502 and 503, AND circuits 504 and 505, a D flip-flop 506, and AND circuits (fall detect circuits) 507 and 508.

To a set terminal S of the RS flip-flop 501, a set signal is provided from the control circuit 401 when output of a read clock to the read clock line 114 should be started. To a reset terminal R of the RS flip-flop 501, a reset signal is provided from the counter 404 when output of the read clock to the read clock line 114 should be stopped. The RS flip-flop 501 outputs an "H" signal when a set signal is provided to its set terminal S, and outputs an "L" signal when a reset signal is provided to its reset terminal R.

To the AND circuit 504, the output of the RS flip-flop 501 and the output of the D flip-flop 506, i.e., a read clock, are provided. The AND circuit 504 outputs an "L" signal only when both of the entries are "H", and outputs "H" signal otherwise.

To the AND circuit 505, the outputs of the three AND circuits 504, 507 and 508 are provided. The AND circuit 505 outputs an "H" signal only when all of the three entries are "H", and outputs "L" signal otherwise.

To the AND circuit 507, the output of the RS flip-flop 501 and the output of the D flip-flop 502 are provided. The AND circuit 507 outputs "L" signal only when the output of the D flip-flop 502 is "H" and the output of the RS flip-flop 501 is "L", and outputs "H" signal otherwise.

To the AND circuit 508, the output of the D flip-flop 502 and the output of the D flip-flop 503 are provided. The AND circuit 507 outputs an "L" signal only when the output of the D flip-flop 503 is "H" and the output of the D flip-flop 502 is "L", and outputs "H" signal otherwise.

To an input D of the D flip-flop 502, the output of the RS flip-flop 501 is provided. The D flip-flop 502 continues to output the signal which is provided to its D terminal at a time point where a clock (i.e., a clock whose cycle time is half the read clock) is provided to its clock terminal, from the entry of the clock until the entry of next clock.

To an input D of the D flip-flop 503, the output of the D flip-flop 502 is provided. The D flip-flop 503 continues to output the signal which is provided to its D terminal at a time point where a clock (i.e., a clock whose cycle time is half the read clock) is provided to its clock terminal, from the entry of the clock until the entry of next clock.

To an input D of the D flip-flop 506, the output of the AND circuit 505 is provided. The D flip-flop 506 continues to output the signal which is provided to its D terminal at a time point where a clock (i.e., a clock whose cycle time is half the read clock) is provided to its clock terminal, from the entry of the clock until the entry of next clock.

With such a structure, when a set signal is provided to the set terminal S of the RS flip-flop 501 and the RS flip-flop 501 outputs an "H" signal, the AND circuits 507 and 508 each output an "H" signal simultaneously with such setting. On the other hand, when a reset signal is provided to the reset terminal R of the RS flip-flop 501 and the RS flip-flop 501 outputs an "L" signal, the AND circuit 507 outputs an "L" signal which is delayed by one read clock (half the cycle time of the read clock (tRC/2)) because of the presence of the D flip-flop 502, and the AND circuit 507 outputs an "L" signal which is delayed by two read clocks (one cycle time of the read clock (tRC)) because of the presence of the two D flip-flops 502 and 503.

On the other hand, when a set signal is provided to the set terminal S of the RS flip-flop 501 and an "H" signal is provided from the RS flip-flop 501 to the AND circuit 504, the AND circuit 504 outputs an "H" signal because no read clock is provided at the time point of setting. Here, because an "H" signal is provided from each of the AND circuits 507 and 508 to the AND circuit 505, the AND circuit 505 outputs an "H" signal. The D flip-flop 506 outputs an "H" signal at a time point where a clock is provided. Then, the AND circuit 504 outputs an "L" signal. Accordingly, the AND circuit 505 outputs an "L" signal. The D flip-flop 506 outputs an "L" signal at a time point where a clock is provided. Then, the AND circuit 504 outputs an "H" signal. In this manner, every time a clock is input to the D flip-flop 506, the output from the AND circuit 504 alternates between an "H" signal and an "L" signal, and as a result, an "H" signal and an "L" signal are alternately output from the D flip-flop 506 to the read clock line 114.

On the other hand, when a reset signal is provided to the reset terminal S of the RS flip-flop 501, the AND circuit 504 outputs an "H" signal. Here, as described in the foregoing, the AND circuit 507 outputs an "L" signal which is delayed by one read clock (half the cycle time of the read clock (tRC/2)) because of the presence of the D flip-flop 502, and the AND circuit 507 outputs an "L" signal which is delayed by two read clocks (one cycle time of the read clock (tRC)) because of the presence of the two D flip-flops 502 and 503. Accordingly, the AND circuit 505 outputs an "L" signal for a period longer by two read clocks (one cycle time of the read clock (tRC)) than it does before the reset signal is provided to the reset terminal S of the RS flip-flop 501. Hence, an "L" signal is output from the D flip-flop 506 to the read clock line 114 for a period longer by two read clocks (one cycle time of the read clock (tRC)) than before.

Here, the reference numeral 511 in the drawing denotes an output signal of the RS flip-flop 501, which will be referred to in the description given later referring to the timing chart of FIG. 7.

Note that the circuit shown in FIG. 5 is an exemplary circuit for extending the "L" period of the last read clock which is output from the memory controller 102 to the read clock line 114, and the concept of the present embodiment is not limited to the circuit shown in FIG. 5 and it may be any circuit so long as it can realize the similar function.

FIG. 6 is a circuit diagram showing a specific configuration of the input circuit 403.

The input circuit 403 includes D flip-flops 601, 602, 603, and 605, and a selector 604.

To an input terminal D of the D flip-flop 601, data is provided from the data line 115. To a clock terminal CLK of the D flip-flop 601, a return read clock is provided from the return read clock line 116. When the D flip-flop 601 detects the falling edge of the return read clock provided to its clock terminal CLK, the D flip-flop 601 continues to output the data which is provided to the input terminal D, from the detection of the falling edge of the return read clock until the detection of the falling edge of next return read clock. In other words, the D flip-flop 601 outputs data which is provided to its input terminal D in synchronization with the return read clock.

To an input terminal D of the D flip-flop 602, data is provided from the data line 115. To a clock terminal CLK of the D flip-flop 602, a read clock is provided from the read clock line 114. When the D flip-flop 602 detects the rising edge of the read clock which is provided to its clock terminal CLK, the D flip-flop 602 continues to output the data which is provided to the input terminal D, from the detection of the rising edge of the read clock until the detection of the rising edge of next read clock. In other words, the D flip-flop 602 outputs data which is provided to its input terminal D in synchronization with the read clock.

To an input terminal D of the D flip-flop 603, an output Q of the D flip-flop 601 is provided. To a clock terminal CLK of the D flip-flop 603, an internal clock of the control circuit 401 is provided. The D flip-flop 603 continues to output the data which is provided to its input terminal D at a time point where the internal clock of the control circuit 401 is provided to its clock terminal CLK, from the entry of the internal clock to the entry of next internal clock. In other words, the D flip-flop 603 outputs the data which is provided to its input terminal D in synchronization with the internal clock of the control circuit 401.

The selector 604 selectively outputs one of the data output from the D flip-flop 602 or the data output from the D flip-flop 603, based on a signal from the counter 404. Specifically, until the selector 604 receives a signal from the counter 404 indicating that the data is the last piece of data, the selector 604 outputs the data received from the D flip-flop 603; and when the selector 604 receives a signal from the counter 404 indicating that the data is the last piece of data, the selector 604 outputs the data received from the D flip-flop 602.

To an input terminal D of the D flip-flop 605, the data output from the selector 604 is provided. To a clock terminal CLK of the D flip-flop 603, the internal clock of the control circuit 401 is provided. The D flip-flop 605 continues to output data which is provided to its input terminal D at a time point where the internal clock of the control circuit 401 is provided to its clock terminal CLK, from the entry of the internal clock to the entry of next internal clock. In other words, the D flip-flop 605 outputs to the control circuit 401 the data which is provided to its input terminal D in synchronization with the internal clock of the control circuit 401.

In this manner, until the input circuit 403 is reported by the counter 404 that the data is the final piece of data, the input circuit 403 takes in pieces of data from the data line 115 in synchronization with the return read clocks of the return read clock line 116; and when the input circuit 403 is reported by the counter 404 that the data is the final piece of data, the input circuit 403 takes in the piece of data from data line 115 in synchronization with the read clock of the read clock line 114.

Here, the reference numerals 611 to 615 respectively denote output signals of the D flip-flops 601, 602, 603, and 605, and that of the selector 604, which will be referred to in the description given later referring to the timing chart of FIG. 7.

Note that the circuit shown in FIG. 6 is an exemplary circuit which has a function to take-in data at two types of take-in timing (i.e., the timing which is in synchronization with the return read clock line 116 and the timing which is in synchronization with the read clock line 114), as the timing of taking in the data which is output from the memory 101 to the data line 115. Any circuit other than that shown in FIG. 6 can be employed so long as it can realize the similar function.

Figure 7:
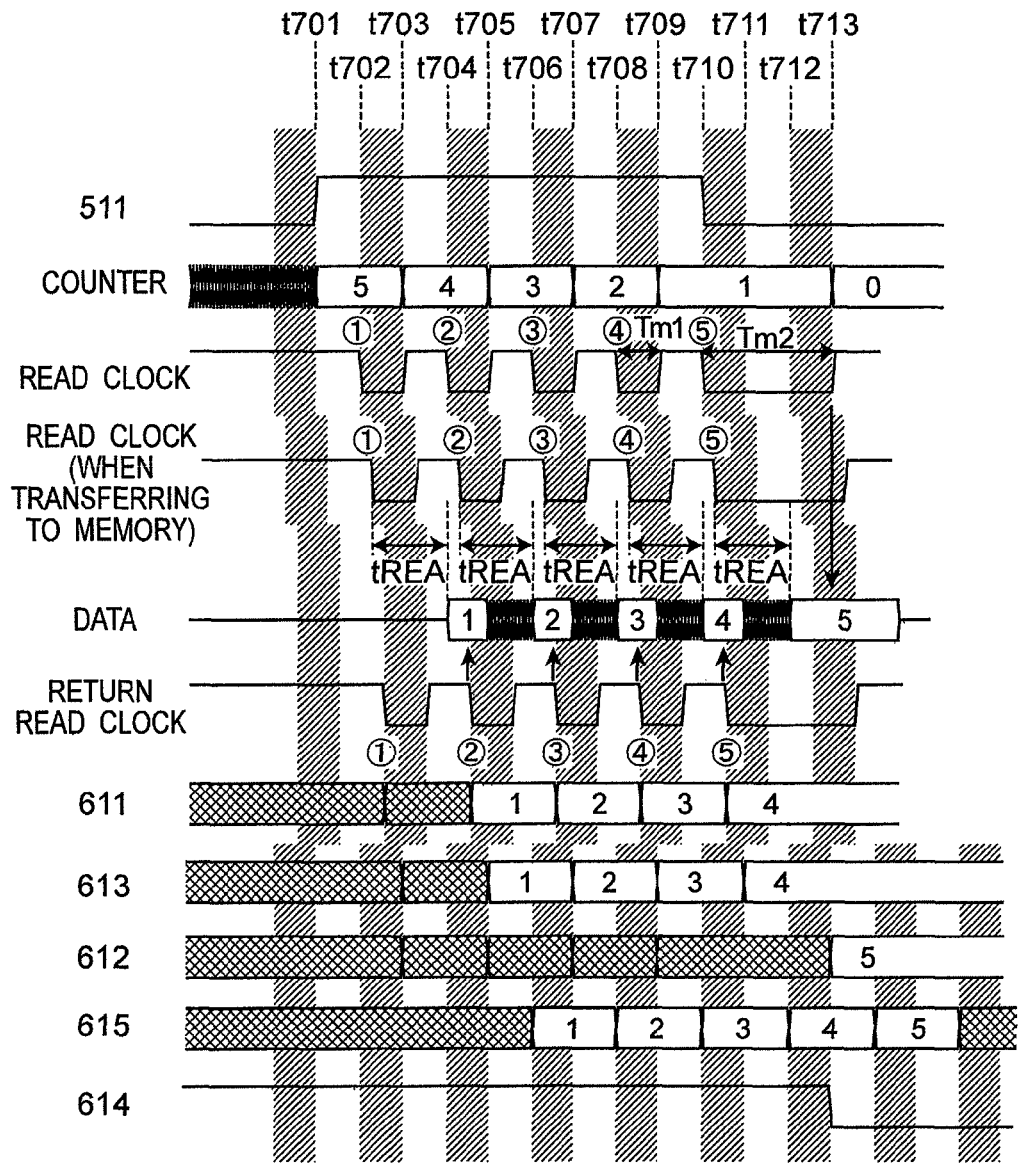
FIG. 7 is a timing chart in data reading.

FIG. 7 is a timing chart showing a state where the memory controller 102 reads data from the memory 101. The timing chart of FIG. 7 shows an exemplary case where the memory controller 102 reads five-word data from the memory 101.

At time t701, the control circuit 401 of the memory controller 102 outputs a set signal to the RS flip-flop 501 of the clock control circuit 402. As a result, the output signal 511 of the RS flip-flop 501 becomes "H", and the clock control circuit 402 outputs a toggle signal that toggles between "L" and "H" to the read clock line 114. Further, when outputting the set signal to the RS flip-flop 501, the control circuit 401 sets "five", which is the number of read words, in the counter 404 as an initial value of the counter 404.

The counter 404 decrements the counter value in synchronization with the rising edge of a read clock.

The processing of taking in data from the memory 101 is carried out with reference to the timing of the falling edge of a return read clock, except for the final word data. What should particularly be recognized herein is that the falling edge of the second return read clock is used in order to take in the first piece of data. Similarly, in order to take in the Nth piece of data, an (N+1)th read clock is supplied to the memory 101, to use the falling edge of an (N+1)th return read clock. Supplying the (N+1)th clock to the memory 101 causes the memory 101 to output (N+1)th piece of data.

The reason why the memory controller 102 takes in data from the memory 101 with reference to the return read clock instead of the read clock is as follows. That is, there are capacitive components between the ground and the read clock line 114 connecting the memory controller 102 and the memory 101, and the capacitive components cause delay of clock which is transferred on the read clock line 114. In order to achieve ever faster operation, control must be exerted with tRC that is slightly longer than tREA. Therefore, the return read clock is employed as the reference, so as to avoid the effect of the delay. For example, while time t704 corresponds to the timing of the falling edge of the read clock, it is not timing at which data 1 of the data line 115 can correctly be taken in. Accordingly, the return read clock is used.

When the counter value reaches "1", the counter 404 reports to the clock control circuit 402 that it is the access of the final word. Specifically, the counter 404 outputs a reset signal to the RS flip-flop 501 of the clock control circuit 402.

When the RS flip-flop 501 is reset upon receipt of the reset signal, the clock control circuit 402 causes the "L" period (output period (Tm2)) of the fifth (last) read clock associated with the five-word read processing to be longer than the "L" period (output period (Tm1)) of each of the first to fourth read clocks. Specifically, in the present embodiment, for the "L" period (output period) of the fifth read clock, three read clocks (3/2 times as great as the read clock cycle (3/2 tRC)) are secured. Then, the clock control circuit 402 rises the read clock at the timing of time t713.

The memory 101 holds the fifth piece of data (data 5) on the data line 115, from after tREA from the rise of the fifth read clock (time t711) and until after tRHZ (see FIG. 3) from the rising timing of the read clock (time t713) (i.e., after tRHZ, the memory 101 stops outputting data to the data line 115). Here, in the present embodiment, as has been described in the foregoing, the "L" period (output period (Tm2)) of the fifth read clock is caused to become longer than the "L" period (output period (Tm1)) of each of the first to fourth read clocks (i.e., the cycle time of the last read clock is caused to become longer than the others). Therefore, as compared to a case in which the "L" period (output period (Tm2)) is not caused to become longer, it becomes possible to allow the fifth piece of data (data 5) to be held on the data line 115 for a longer period (i.e., to allow the data to be output). This increases the period during which the memory controller 102 can take in data from the memory 101.

Here, in the present embodiment, the "L" period (Tm2) of the fifth read clock is set such that the rising timing of the fifth read clock and the period during which the fifth piece of data (data 5) is held on the data line 115 overlap each other on the temporal axis. This allows the D flip-flop 602 to take in the fifth piece of data using the rise of the fifth read clock, while the fifth piece of data (data 5) is held on the data line 115 (before tRHZ).

The counter 404 decrements the counter value from "1" to "0", and simultaneously therewith, causes the control signal to the selector 604 of the input circuit 403 to be "L". Because the selector 604 receives from the counter 404 the control signal of "L", the selector 604 outputs data received from the D flip-flop 602. The D flip-flop 605 takes in the data output from the selector 604 in synchronization with the internal circuitry, and outputs it to the control circuit 401.

Figure 8:
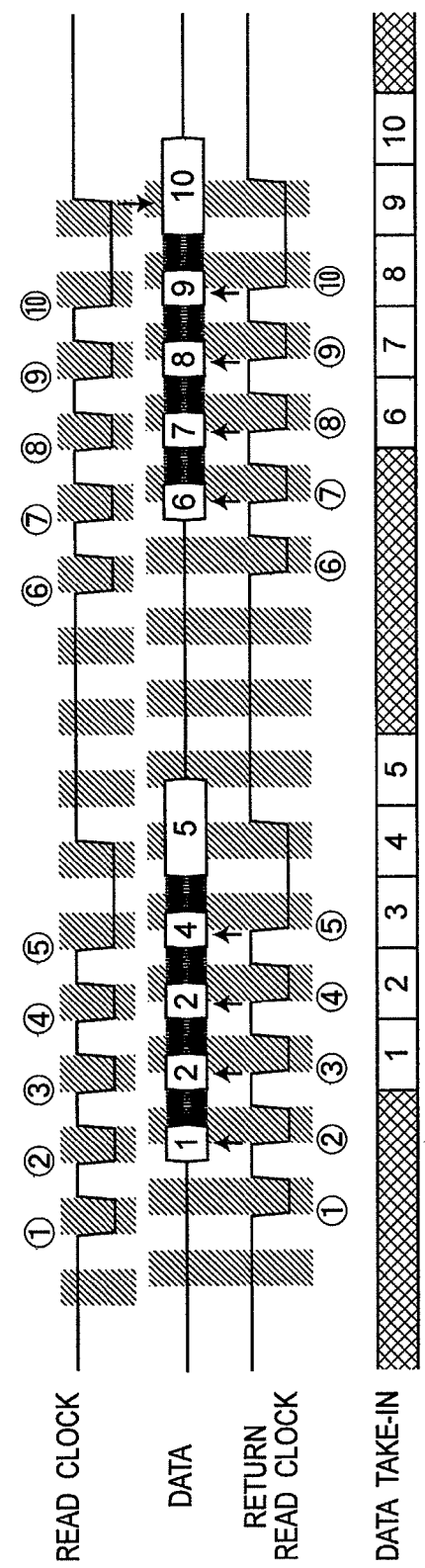
FIG. 8 is a timing chart in data reading.
Figure 9:
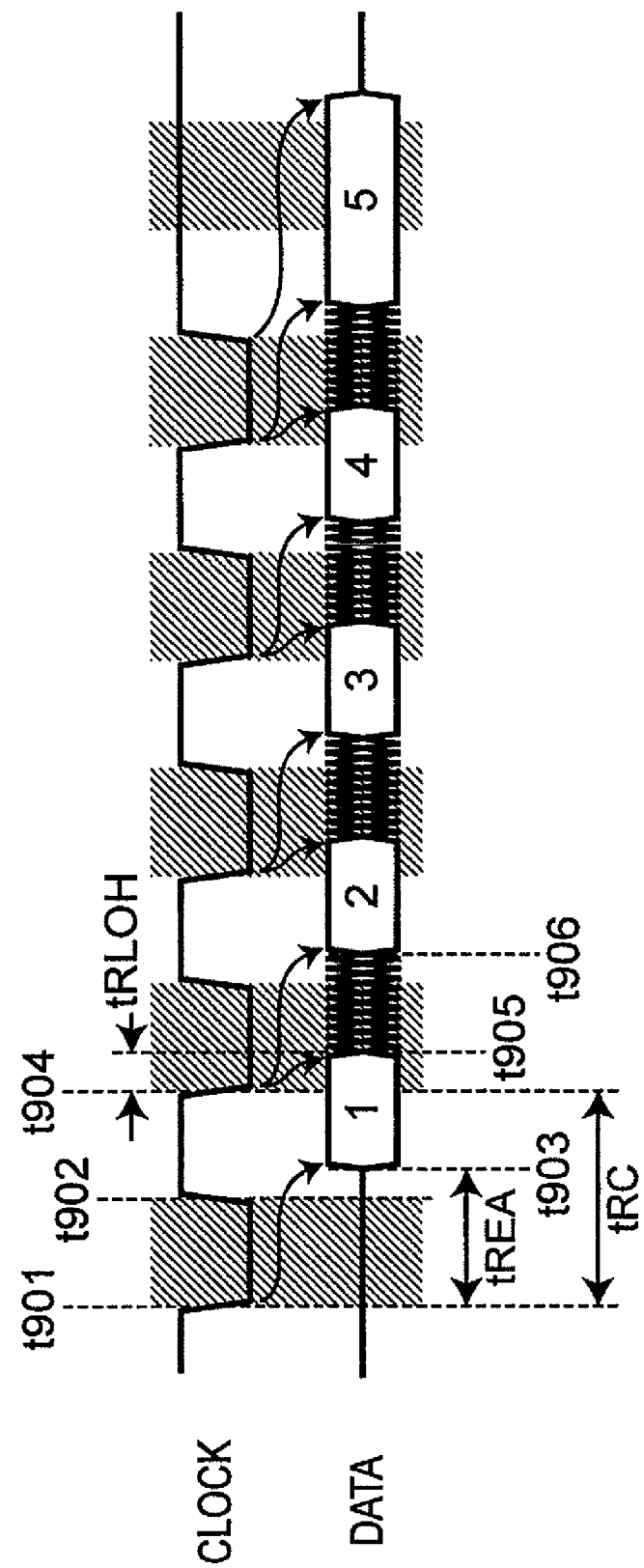
FIG. 9 is a timing chart in data reading with a conventional memory system.
Figure 10:
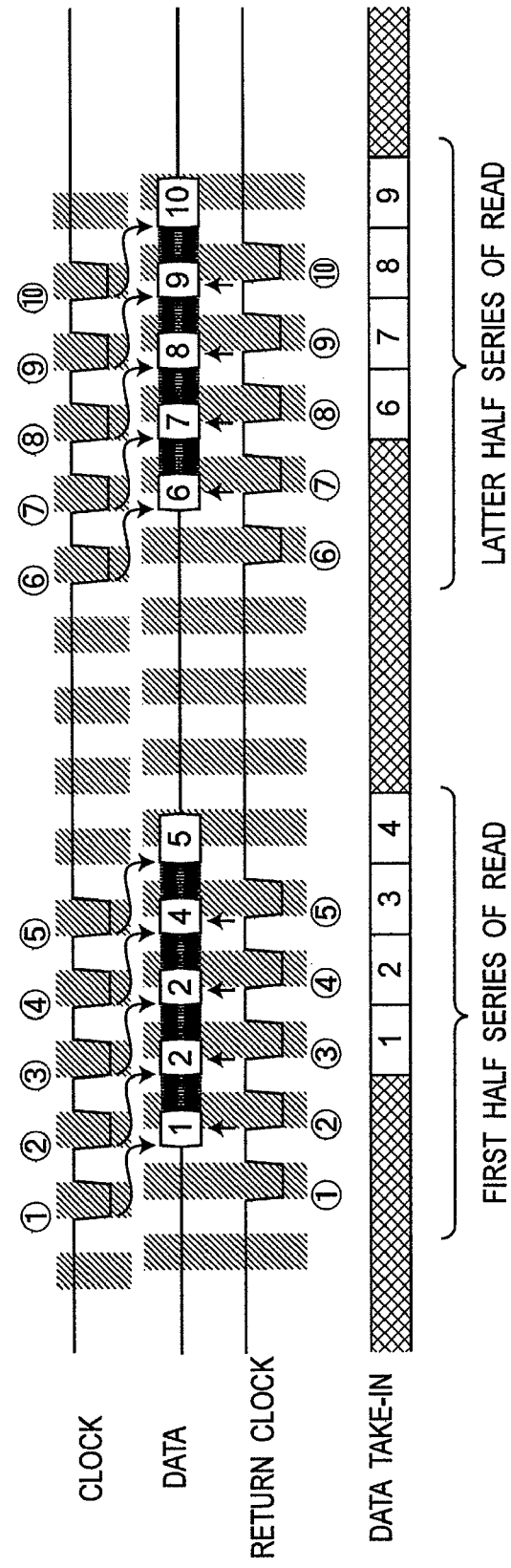
FIG. 10 is a timing chart in data reading with a conventional memory system.

In this manner, by outputting the first to fifth read clocks, the memory controller 102 can read and take in the first to fifth pieces of data from the memory 101. Further, as shown in the timing chart of FIG. 8, when the memory controller 102 takes in the first to fifth pieces of data and thereafter outputs the sixth to tenth read clocks to the memory 101, the memory 101 increments the address to output the sixth to tenth pieces of data. The memory controller 102 can take in the output sixth to tenth pieces of data in the same manner as to the first to fifth pieces of data. The eleventh and following pieces of data can also be read and take in from the memory 101 in a similar manner, by the memory controller 102 outputting the eleventh and following read clocks on a five-by-five basis.

As has been described in the foregoing, with the memory system of the present embodiment, when the memory controller 102 consecutively reads N (in the present embodiment, N=5) pieces of data from the memory 101, the Nth piece of data is taken in in a period from start of output of the Nth piece of data based on the Nth read clock to stop of output of the Nth piece of data. Further, the memory controller 102 sets the output period of the Nth read clock to be longer than the output period of each of the first to (N−1)th read clocks. Thus, as compared to a case in which the "L" period (output period (Tm2)) is not set to be longer, the fifth piece of data (data 5) can be held on the data line 115 for a longer period (i.e., to allow the data to be output). That is, this increases the period during which the memory controller 102 can take in data from the memory 101. In the present embodiment, the rising timing of the Nth read clock is set to fall within a period during which the Nth piece of data can be output to the data line 115, thereby making it possible to take in the Nth piece of data using the rise of the Nth read clock. It is noted that, it is also possible to take in the Nth piece of data using a signal other than the rise of the Nth read clock, in the period during which the Nth piece of data can be output to the data line 115. For example, as such a signal other than the rise of the Nth read clock, a clock generated by using the internal clock of, e.g., the memory controller 102, and any signal generated after a predetermined time equal to or longer than tREA from the fall of the Nth read clock, and the like can be used.

Here, with the conventional techniques, the Nth piece of data cannot be taken in. Further, when an attempt is made to read this piece of data that could not be taken in, the memory controller 102 must once again specify an address or a command specifying the address to the memory 101. That is, because a command specifying the read target address must be issued, the overhead becomes great and data transfer performance in the memory system is impaired.

However, with the memory system of the present embodiment, by outputting N read clocks, the memory controller 102 can read and take in from the memory 101 the pieces of data as many as the output read clocks. Accordingly, by outputting the (N+1)th and following read clocks, it becomes possible to cause the (N+1)th and following pieces of data to be output from the memory 101, and the output data can be taken in by the memory controller 102. That is, after the memory controller 102 reads and takes in the N pieces of data, a command specifying the address needs not to be issued once again when the memory controller 102 is to read the (N+1)th and following pieces of data. This makes it possible to improve the data transfer performance in the memory system.

Further, with the memory system of the present embodiment, because the first to (N−1)th pieces of data are taken in in synchronization with the return read clocks, even when there is a delay in transferring any read clock or data between the memory 101 and the memory controller 102, it becomes possible for the memory controller to take in the data output from the memory.

While the present embodiment is configured such that the first to (N−1)th pieces of data are taken in in synchronization with the fall of the return read clocks of the first to (N−1)th (fifth in the above-described exemplary case), when the delay time is small, the first to (N−1)th pieces of data may be taken in in synchronization with the fall of the read clocks instead of the return read clocks. In this case, the return read clock line 116 may not be provided.

Further, while the present embodiment is configured such that, when outputting N pieces of data, the memory 101 starts the output with reference to the falling edge of each of the first to Nth read clocks (i.e., edges at the start of output), the memory 101 may refer to the rising edge of each of the first to Nth read clocks (i.e., edges at the completion of output). Still further, while the memory 101 stops outputting the first to (N−1)th pieces of data with reference to the falling edge of each of the second to Nth read clocks (i.e., edges at the start of output), respectively, the memory 101 may refer to the rising edge of each of the second to Nth read clocks (i.e., edges at the completion of output) (provided that the pieces of data are output later than the rising edge of each of the second to Nth read clock (i.e., edges at the completion of output)). Still further, while the memory controller 102 takes in the first to (N−1)th pieces of data in synchronization with the falling edges of the second to Nth read clocks (i.e., edges at the start of output), depending on the timing at which pieces of data are each output to the data line 115, the memory controller 102 may take in pieces of data in synchronization with the rising edges of the second to Nth read clocks (i.e., edges at the completion of output). Still further, while the read clock is the fall clock in the present embodiment, it may be the rise clock. In this case, control should be exerted by adopting the rising edge as the edge at the start of output and adopting the falling edge as the edge at the completion of output.

In the present embodiment, for ease of explanation, the description has been given of the case where the number N of pieces of data included in a chunk of data read from the memory is N=5. However, the number N of pieces of data included in a chunk of data is not limited to N=5. A chunk of data containing pieces of data to be read from the memory may include ECC codes. In this case, the size of a chunk of data read from the memory is as great as the size of data handled by the memory controller plus the size of the ECC codes. For example, when the size of the data is 512 bytes, and the size of the ECC codes is 16 bytes, the size of a chunk of data is 528 bytes. Causing a chunk of data to include the ECC codes in this manner, every time a chunk of data is read from the memory, the memory controller can perform an ECC process. This makes it easier to perform the ECC process. It is noted that N may be variable in accordance with the buffer capacity of the memory system and the like, and the technical concept of the present embodiment holds true for such a case.

INDUSTRIAL APPLICABILITY

The present invention is useful in a memory system with high user convenience, capable of improving the data transfer efficiency in the memory system to achieve acceleration.

What is claimed is:

1. A memory system comprising:
a memory;
a memory controller; and
a memory interface electrically connecting the memory and the memory controller to each other, wherein
the memory interface includes a data line driven by the memory for transferring data, and a clock line which is driven by the memory controller and transfers read clocks for controlling a timing of outputting the data from the memory to the data line,
when the memory outputs N pieces of data, the memory starts outputting N pieces of data in synchronization with first to Nth read clocks consecutively output from the memory controller, stops the outputting of first to (N−1)th pieces of data respectively in synchronization with second to Nth read clocks, and stops the outputting of Nth piece of data after a first predetermined time from stop of output of the Nth read clock, and
the memory controller takes in the first to (N−1)th pieces of data respectively in synchronization with the second to Nth read clocks, and takes in the Nth piece of data in a period from start of output of the Nth piece of data based on the Nth read clock to stop of the output of the Nth piece of data, and the memory controller sets an output period of the Nth read clock to be longer than an output period of each of the first to (N−1)th read clocks.

2. The memory system according to claim 1, wherein
when the memory outputs the N pieces of data, the memory starts outputting the N pieces of data within a second predetermined time from either one of falling edge and rising edge of each of the first to Nth read clocks consecutively output from the memory controller, stops the outputting of the first to (N−1)th pieces of data within a third predetermined time respectively from either one of falling edge and rising edge of each of the second to Nth read clocks, and stops the outputting of the Nth piece of data after the first predetermined time from stop of output of the Nth read clock.

3. The memory system according to claim 2, wherein
the memory controller controls a cycle of the first to (N−1)th read clocks to be greater than a time obtained by subtracting the third predetermined time from the second predetermined time.

4. The memory system according to claim 2, wherein
the memory controller controls a cycle of the first to (N−1)th read clocks to be smaller than a time twice the second predetermined time and to be greater than the second predetermined time.

5. The memory system according to claim 1, wherein
the memory controller takes in the first to (N−1)th pieces of data respectively in synchronization with either one of falling edge and rising edge of each of the second to Nth read clocks.

6. The memory system according to claim 1, wherein
the memory controller takes in the Nth piece of data in synchronization with an edge at completion of output of the Nth read clock.

7. A memory system comprising:
a memory;
a memory controller; and
a memory interface electrically connecting the memory and the memory controller to each other, wherein
the memory interface includes a data line driven by the memory for transferring data, and a clock line which is driven by the memory controller and transfers read clocks for controlling a timing of outputting the data from the memory to the data line, and a return clock line for returning the read clock arrived at the memory via the clock line back to the memory controller as return read clock,
when the memory outputs N pieces of data, the memory starts outputting N pieces of data in synchronization with first to Nth read clocks consecutively output from the memory controller, stops the outputting of first to (N−1)th pieces of data respectively in synchronization with second to Nth read clocks, and stops the outputting of Nth piece of data after a first predetermined time from stop of output of the Nth read clock, and
the memory controller takes in the first to (N−1)th pieces of data respectively in synchronization with second to Nth return read clocks, and takes in the Nth piece of data in a period from start of output of the Nth piece of data based on the Nth read clock to stop of the output of the Nth piece of data, and the memory controller sets an output period of the Nth read clock to be longer than an output period of each of the first to (N−1)th read clocks.

8. The memory system according to claim 7, wherein
when the memory outputs the N pieces of data, the memory starts outputting the N pieces of data within a second predetermined time from either one of falling edge and rising edge of each of the first to Nth read clocks consecutively output from the memory controller, stops the outputting of the first to (N−1)th pieces of data within a third predetermined time respectively from either one of falling edge and rising edge of each of the second to Nth read clocks, and stops the outputting of the Nth piece of data after the first predetermined time from stop of output of the Nth read clock.

9. The memory system according to claim 8, wherein the memory controller controls a cycle of the first to (N−1)th read clocks to be greater than a time obtained by subtracting the third predetermined time from the second predetermined time.

10. The memory system according to claim 8, wherein the memory controller controls a cycle of the first to (N−1)th read clocks to be smaller than a time twice the second predetermined time and to be greater than the second predetermined time.

11. The memory system according to claim 7, wherein the memory controller takes in the first to (N−1)th pieces of data respectively in synchronization with either one of falling edge and rising edge of each of the second to Nth return read clocks.

12. The memory system according to claim 7, wherein the memory controller takes in the Nth piece of data in synchronization with an edge at completion of output of the Nth read clock.

\* \* \* \* \*